United States Patent [19]

Futamura

[11] Patent Number: 4,952,790

[45] Date of Patent: Aug. 28, 1990

[54] ELECTRICAL DISCHARGE MACHINING CONTROL CIRCUIT

[75] Inventor: Shoji Futamura, Kawasaki, Japan

[73] Assignee: Institute of Technology Precision Electrical Discharge Works, Kanagawa, Japan

[21] Appl. No.: 130,564

[22] Filed: Dec. 9, 1987

[30] Foreign Application Priority Data

Dec. 12, 1986 [JP] Japan .................. 61-296373

[51] Int. Cl.⁵ .......................... B23H 1/02; B23H 7/20
[52] U.S. Cl. ............................. 219/69.13; 219/69.16
[58] Field of Search ............... 219/69.13, 69.18, 69.16, 219/59.2, 69.17

[56] References Cited

U.S. PATENT DOCUMENTS

| | | | |
|---|---|---|---|
| 4,071,729 | 1/1978 | Bell, Jr. ............................. | 219/69.13 |
| 4,292,490 | 9/1981 | Bell, Jr. et al. .................. | 219/69.13 |
| 4,415,791 | 11/1983 | Yamada et al. ................... | 219/69.13 |
| 4,495,394 | 1/1985 | McGregor et al. .............. | 219/69.13 |
| 4,533,811 | 8/1985 | Bühler ............................. | 219/69.16 |
| 4,606,007 | 8/1986 | Inoue ............................... | 219/69.16 |
| 4,667,049 | 5/1987 | Matsumura et al. ............. | 219/69.16 |

FOREIGN PATENT DOCUMENTS

| | | | |
|---|---|---|---|
| 102628 | 6/1983 | Japan ............................... | 219/69.13 |
| 61-25723 | 2/1986 | Japan ............................... | 219/69.13 |

Primary Examiner—A. D. Pellinen
Assistant Examiner—Geoffrey S. Evans
Attorney, Agent, or Firm—McGlew & Tuttle

[57] ABSTRACT

A machining control device for discharge machining equipment. The arrangement provides discharge machining equipment such that it may accomplish discharge machining on a workpiece under appropriate machining conditions suited to the progress of machining. Effective and stable discharge machining can be effected by structuring machining conditions, which are converted to control set values for the machining control device, into such a fashion as to continuously shift from a rough machining mode to a precision machining mode as an electrode travels.

9 Claims, 10 Drawing Sheets

ELECTRICAL DISCHARGE MACHINING CONTROL CIRCUIT

BACKGROUND OF THE INVENTION

1. Field of the Invention

This invention relates generally to discharge machining equipment of machining a workpiece by electric discharge into desired dimensions and surface roughness, and more particularly to a machining control device for discharge machining equipment adapted so that machining can be effected in a short machining time with reproducible machining accuracy and surface roughness.

2. Description of the Prior Art

As machining speed is increased in discharge machining, machining accuracy and surface roughness tend to be deteriorated, and conversely as machining accuracy and surface roughness are improved, machining speed tends to be lowered. In order to realize machining in the shortest possible time while maintaining the dimensions and surface roughness of the workpiece, therefore, it has heretofore been practiced that machining conditions (the magnitude and duration of discharge current, etc.) are determined in accordance with the progress of machining, and appropriate machining conditions are selected stepwise for each machining stage from the start of machining to the end of machining.

Now, the prior art will be described in more detail, referring to FIGS. 3 and 4.

Figure 3:
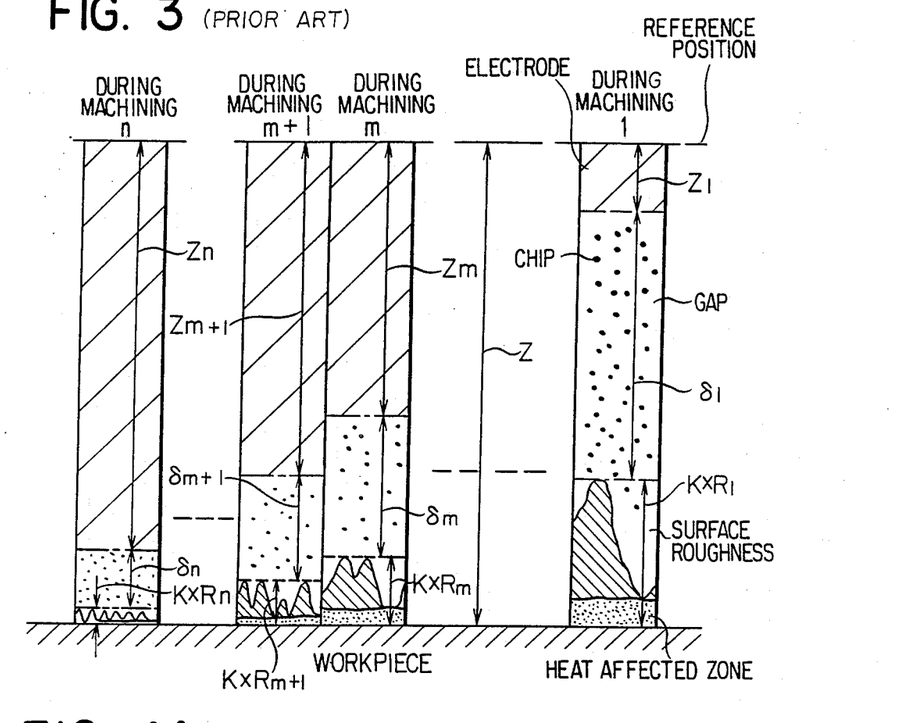
FIG. 3 is a diagram of assistance in explaining the state of discharge machining

FIG. 3 is a diagram of assistance in explaining the progress of discharge machining. The machining state 1 shown on the right side of the figure illustrates the state where as machining proceeds under the machining conditions 1 in which rough machining is carried out at high speed, the electrode has been fed from the reference position to the position of an electrode feed $Z_1$.

In the prior art, when machining proceeds under a machining condition 1 to the machining state 1 shown in the figure, machining is interrupted temporarily, and machining conditions are changed to a machining condition 2 involving a slightly lower machining speed and slightly improved surface roughness. Under the machining condition 2, machining is resumed until the electrode is fed to a predetermined feed $Z_2$. Then, machining is temporarily interrupted, and machining conditions are changed to a machining condition 3. In this way, machining conditions are sequentially switched over as machining proceeds. A machining state m shown in the figure illustrates a machining state in the course of the machining sequence. As shown in a machining state n in the figure, the electrode is fed until a predetermined feed $Z_n$ is reached under the machining condition n as the final machining stage where satisfactory surface roughness can be achieved though machining speed is extremely low. In the machining state n, the discharge gap is $\delta_n$, and the roughness of the workpiece surface is $K \times R_n$, and the workpiece is machined up to a predetermined position into a predetermined surface roughness. In this way, the prior art is such that machining is temporarily interrupted to sequentially switch over machining conditions so as to realize a short machining time and machining the workpiece up to a predetermined depth into a predetermined surface roughness.

As shown in FIG. 3, the surface of the workpiece during discharge machining has a topmost roughened layer having irregularities due to discharge energy, and a heat affected zone beneath the topmost roughened layer. In the gap between the electrode and the workpiece surface, suspended are chips generated by discharge. The particle size, density, etc. of chip may affect discharge machining.

Figure 4A:
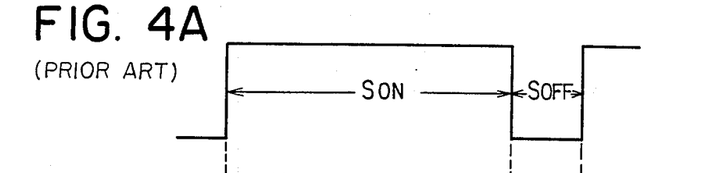
FIG. 4 is a diagram of assistance in explaining discharge voltage pulses
Figure 4B:
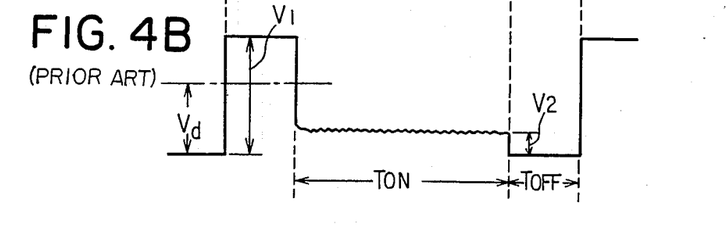

FIG. 4A illustrates the state of power turning on and off across the electrode and the workpiece. $S_{ON}$ indicates the ON duration, and $S_{OFF}$ the OFF duration. FIG. 4B shows changes in discharge voltage pulses applied across the electrode and the workpiece. Since discharge does not start immediately after power is turned on ($S_{ON}$), impedance between the electrode and the workpiece is high, and a high voltage $V_1$ is produced across both. As discharge starts, the voltage across both drops to a lower discharge voltage $V_2$. Consequently, the start of discharge current flow can be known by setting a voltage $V_d$ between the voltages $V_1$ and $V_2$ as the threshold value, and detecting discharge voltage falling below the threshold value. $T_{ON}$ is the duration when discharge current keeps flowing, while $T_{OFF}$ is the duration from the time power is turned off, to interrupt discharge current to the time power is turned on again.

The prior art described above has the following problems.

First, discharge machining having satisfactory reproducibility cannot be expected.

Although there are some formula to calculate the electrode feed $Z_n$ in accordance with the progress of discharge machining, the electrode feed $Z_n$ calculated from the formula does not warrant satisfactory reproducibility for discharge machining. The electrode feed $Z_n$ has heretofore been calculated by substituting in the following equation the data obtained by measuring in advance the machining gap value and the machined surface roughness value by changing any machining conditions among predetermined machining power conditions (discharge current, the ON duration $S_{ON}$, and OFF duration $S_{OFF}$ of power).

$$Z_n = Z - K_t \times R_n - K_f \times \delta_n - \gamma_n \times (Z_n - Z_{n-1})$$

where $K_t$ and $K_f$ are prescribed coefficients; Z the distance between the reference point and the workpiece as a target; $R_n$ a value indicating surface roughness; $\delta_n$ a gap; and $\gamma_n$ electrode consumption ratio.

In actual discharge machining with the prior art, however, there is a difference, caused by the presence of discharge chips, between the size of the machining gap when machining conditions are sequentially changed and the size of the machining gap in the machining performed to obtain the afore-mentioned data. For this reason, discharge machining with satisfactory reproducibility cannot be expected from the above equation.

In the prior art, moreover, discharge current is temporarily turned off when changing machining conditions (particularly, discharge current). This causes discharge chips suspended in the machining gap to be scattered, making the state of machining gap undesirable for discharge machining under the next machining conditions. In other words, the absence of chips in the machining gap makes if difficult to resume discharge in the same machining gap. To resume discharge, therefore, the discharge gap must be reduced prior to the changeover of machining conditions. This, in turn, could lead to machining to an unexpectedly large depth as machining proceeds with the reduced discharge gap. This unwanted condition may happen randomly with different workpieces which are to be subjected to the same machining, resulting in deteriorated machining accuracy and workmanship, or discharge machining with poor reproducibility.

Second, it takes much time to position the electrode to ensure a proper gap with the prior art. This leads to extended machining time, the failure of obtaining desired surface roughness, and the failure of metal removal.

The original purpose of sequentially changing machining conditions is to reduce machining time. The prior art, however, can reduce machining time to some extent, but can still make considerable time, as will be described later. This is because the prior art, which relies on a limited number of changeover steps, tends to involve large differences in machining conditions among changeover steps. (For example, when discharge current is changed from 10A to 8A in a low consumption region, the energy is almost halved, and the size of discharge chips greatly varies.) For this reason, when changing machining conditions to the next step, it takes some time until discharge machining reaches a level expected under that machining condition step.

SUMMARY OF THE INVENTION

It is an object of this invention to provide a machining control device for discharge machining equipment, which is adapted to ensure the machining accuracy and surface roughness of a workpiece being machined with discharge machining equipment.

It is a further object of this invention to provide a machining control device for discharge machining equipment, which is adapted to effect discharge machining at all times in a short time and under appropriate machining conditions.

To accomplish these objects, this invention has a latching means for storing information on the closest distance between an electrode and a workpiece during discharge machining steps, and a memory means for storing information on machining conditions in accordance with the distance between the electrode and the workpiece, and is adapted to sequentially read from the memory means each piece of information on machining conditions corresponding to each of distance values which are to be sequentially latched by the latching means as machining proceeds to perform the control of the discharge machining equipment in accordance with the read information on machining conditions. The expression "the closest distance between an electrode and a workpiece" used here means the distance between the electrode and the workpiece at a time immediately before a shortcircuiting takes place as the electrode approaches the workpiece for discharge machining. Since the information on machining conditions stored in this memory means is set in such a manner as to realize more accurate machining as the distance between the electrode and the workpiece is reduced, and constructed so as to develop in the form of a continuous function with respect to distance, the discharge machining equipment can always realize discharge machining under the optimum machining conditions.

DESCRIPTION OF THE PREFERRED EMBODIMENT

In the following, preferred embodiments of this invention will be described in detail, referring to the accompanying drawings.

Figure 1:
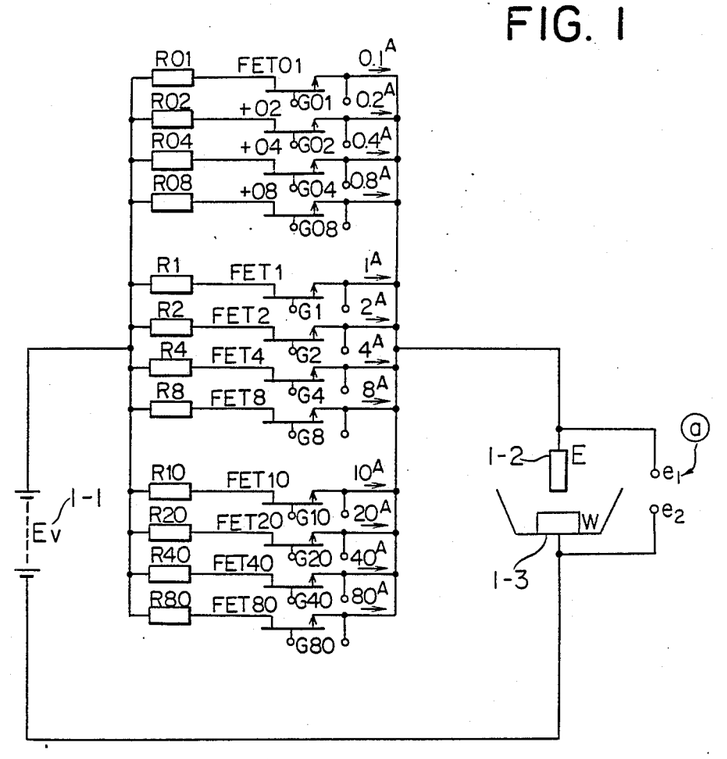
FIG. 1 is a diagram illustrating a main circuit of a first embodiment of this invention

FIG. 1 shows a main circuit of a first embodiment of this invention. 1—1 refers to a d-c power supply; 1-2 to an electrode; 1-3 to a workpiece; $R_{01}$-$R_{80}$ to resistors; $FET_{01}$-$FET_{80}$ to switching transistors. A portion having parallelly connected series circuits of the resistors and the switching transistors comprises a control section. The magnitude of current flowing in each series circuit is set at different values, as shown in FIG. 1. Consequently, various magnitudes of currents can be produced to feed to the electrode 1-2 by combining any current values by turning on any switching transistors. By doing this, current can be continuously increased or decreased in small increments or decrements.

Figure 2:
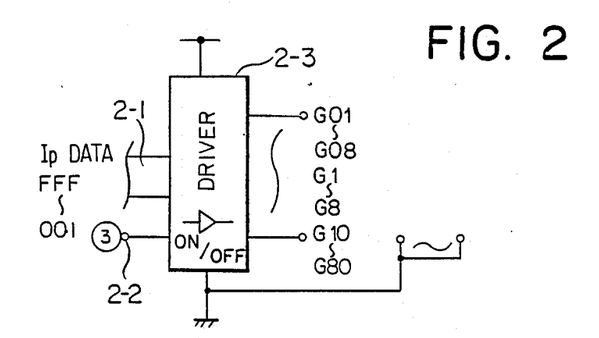
FIG. 2 is a diagram illustrating a control circuit of a first embodiment of this invention

FIG. 2 shows a control circuit for generating an on-off signal to the switching transistors in FIG. 1. 2—2 refers to a terminal for feeding a signal determining the on and off durations of discharge pulses applied across the electrode 1-2 and the workpiece 1-3. The data for determining what degree of current is allowed to flow when discharge pulses are applied, that is, the data ($I_p$ data) for determining which switching transistors are to be turned on is fed to the driver 2-3 via the bus 2-1.

Figure 5:
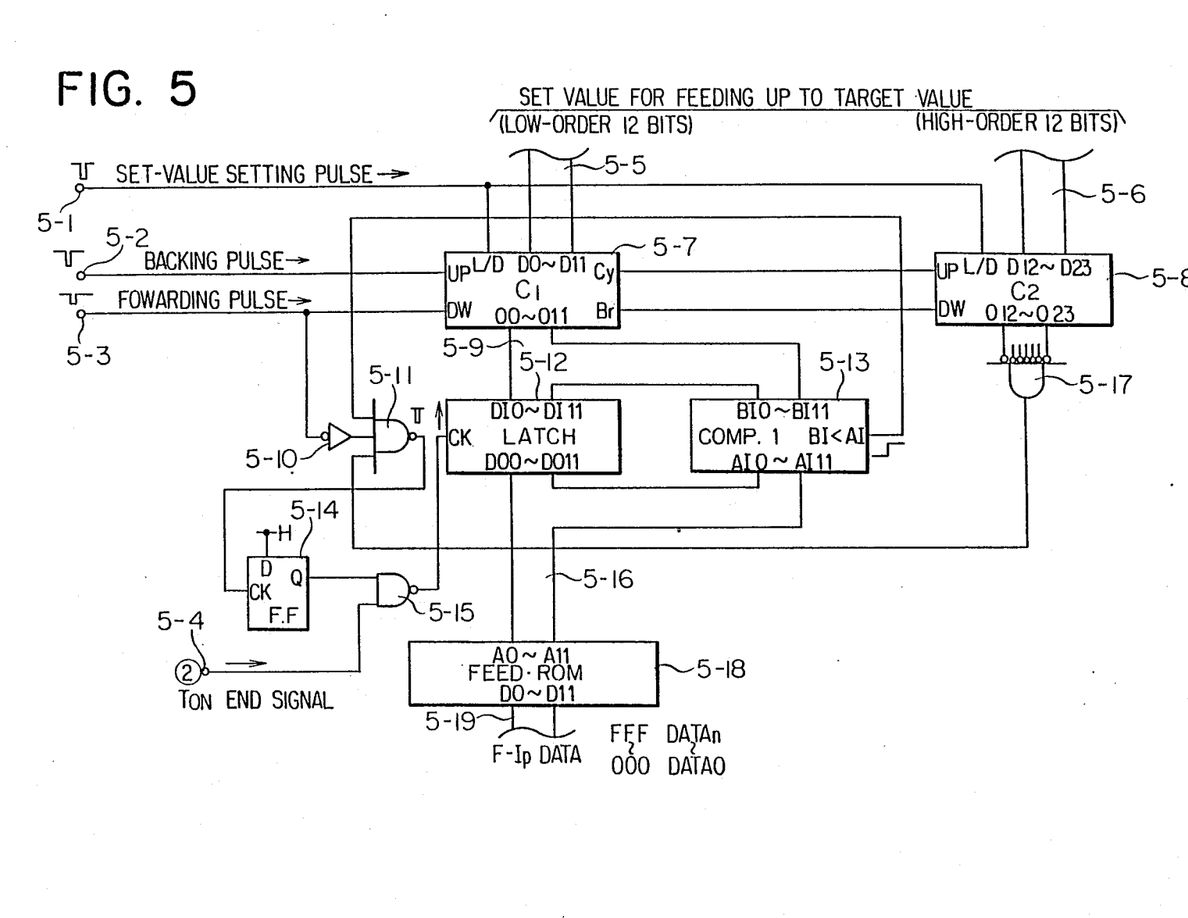
FIG. 5 is a diagram illustrating a first example of a machining condition setting section

FIG. 5 is a diagram illustrating a first example of the machining condition setting section in which a ROM is used to store the data ($I_p$ data) for controlling switching transistors. 5-18 refers to a data storage ROM. When an address is designated by a signal fed through the bus 5-16, the data stored in the address of the ROM is read through the bus 5-19. The signal inputted through the bus 5-16 is a signal relating to the set value of electrode feed (that is, the position of electrode).

Portions other than described above in FIG. 5 are provided to determine addresses on the data storage ROM 5-18. That is, the counters 5-7 and 5-8 are counters for setting the electrode feed up to a target value; the computer 5-7 taking care of the low-order 12 bits (smaller digit portions) or the set value and the counter 5-8 taking care of the high-order 12 bits (larger digit portions) thereof. When a set value setting value comes from the terminal 5-1, a predetermined set value is set in each counter. The value for the counter 5-7 is counted up or down by a retreating pulse from the terminal 5-2 or a backing pulse, or a forwarding pulse, from the terminal 5-3. The forwarding and retreating pulses are inputted from a servo circuit for forwarding and retreating the electrode by detecting voltage, etc. across the electrode and the workpiece.

The comparator 5-13 compares the instruction value for the present electrode position latched in the latching circuit 5-12 and the instruction value newly fed from the counter 5-7 generates an output only when the new instruction value is smaller than the latched value. When this output is generated, the value in the latching circuit 5-12 is updated into that smaller instruction value. Consequently, although discharge machining is carried out by causing the electrode to forward and retreat the electrode little by little (gradually forward the electrode, as a whole) through servo follow-up, the latch instruction in the latching circuit 5-, 12 is changed only when the electrode is substantially forwarded compared with the position before, regardless of retreating followed by forwarding, since the instruction value in the latching circuit is updated only when a smaller instruction value appears. As will be described later, since discharge current, durations $T_{ON}$ and $T_{OFF}$ are set in accordance with the instruction value, these parameters also can be automatically changed only when the electrode is substantially forwarded. Updating is performed at a time when a $T_{ON}$ end signal (a discharge pulse ON duration end signal) comes from the terminal 5-4 because it is not desirable in terms of discharge machining to change the instruction value for electrode position during the discharge pulse ON duration. The NAND circuit 5-17 is provided so that latching operation is initiated after the counter 5-18 is counted down, that is, after the electrode approaches the workpiece slightly.

Figure 8:
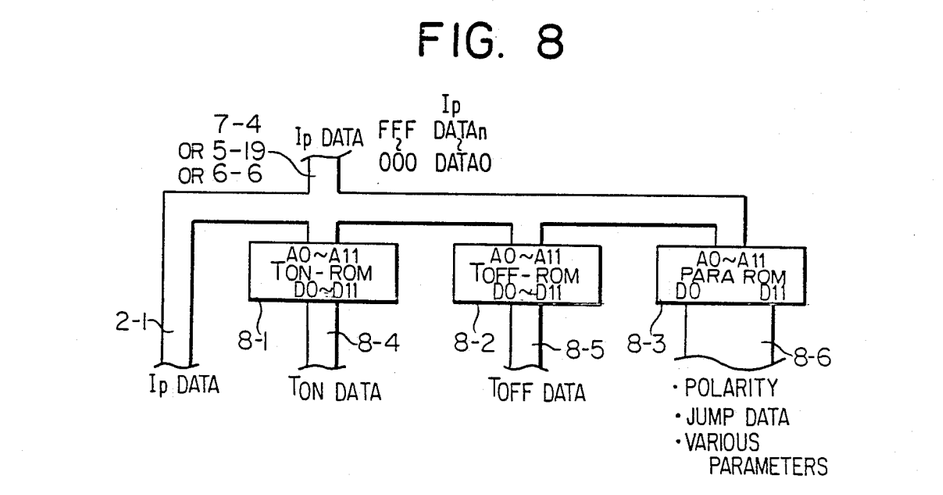
FIG. 8 is a diagram illustrating a machining condition converting section

The data read from the data storage ROM 5-18 to the bus 5-19 is fed to the above-mentioned driver circuit 2-3 shown in FIG. 2, and the $T_{ON}$ data storage ROM shown in FIG. 8.

Figure 6:
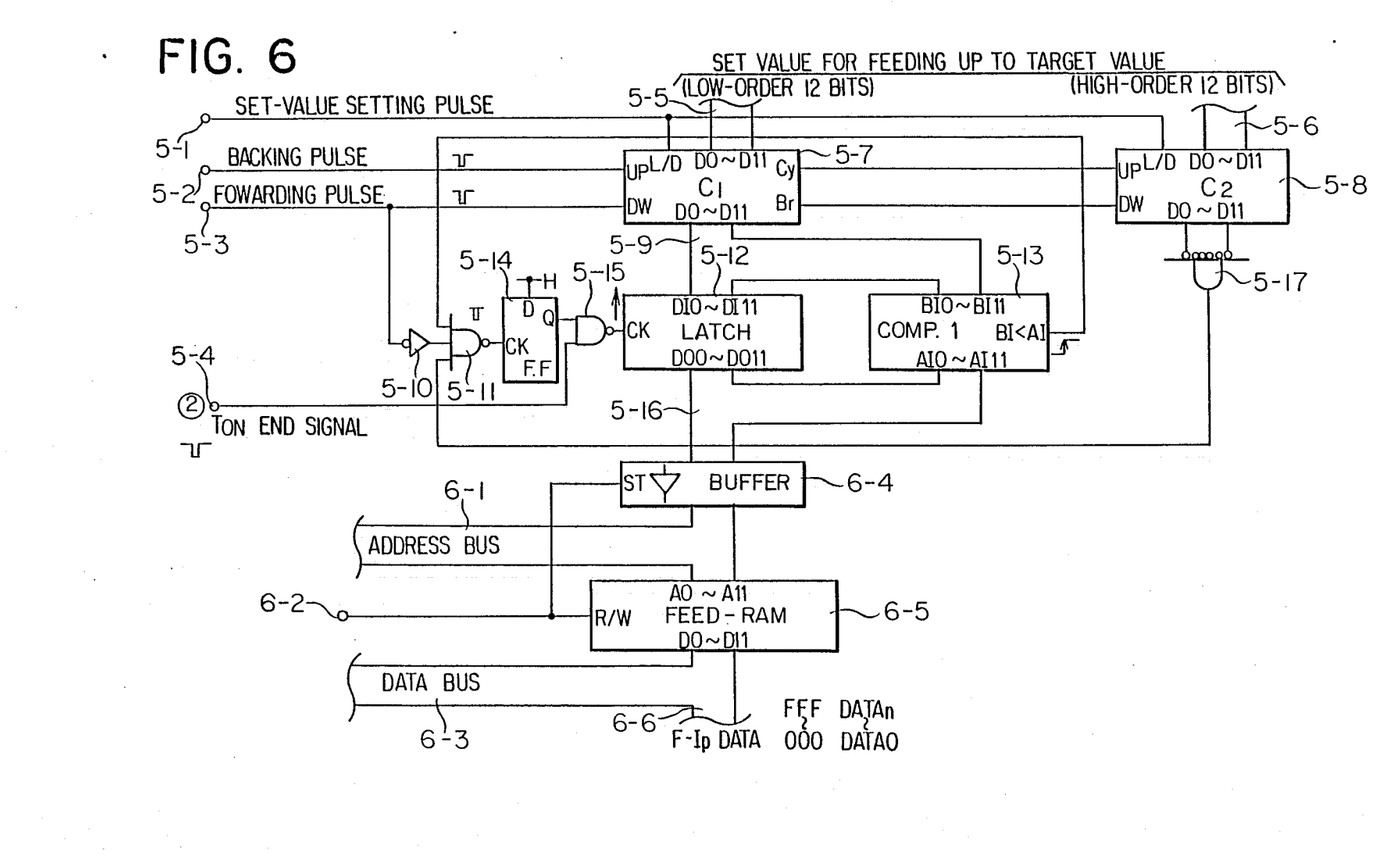
FIG. 6 is a diagram illustrating a second example of a machining condition setting section

FIG. 6 is a diagram illustrating a second example of the machining condition setting section, using a RAM to store the data for controlling switching transistors ($I_p$ data). 6-5 refers to a data storage RAM in which predetermined data is written through the data bus 6-3 into an address designated through the address bus 6-1. The data in accordance with the instruction value is read from the bus 6-6, and fed to the driver circuit 2-3 shown in FIG. 2, the $T_{ON}$ data storage ROM of FIG. 8, etc. In this way, the $I_p$ data can be changed as necessary by using a RAM.

Figure 7:
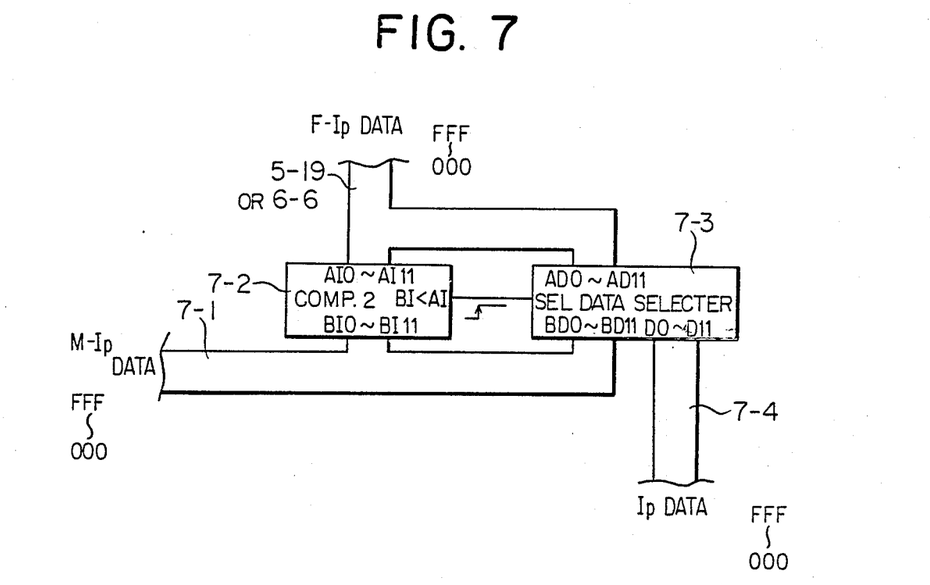
FIG. 7 is a diagram illustrating a manual value setting section

FIG. 7 shows a manual value setting section for manually setting a value required for starting discharge machining from any intermediate process step (mid-process value), not starting with the initial rough machining. When a mid-process value is entered through the bus 7-1, the comparator 7-2 compares that value with the instruction value from FIG. 5 or 6, and outputs a signal to the data selector 7-3 when the instruction value becomes smaller than the mid-process value. Upon receiving the signal, the data selector 7-3 allows an instruction value from the data storage ROM 5-18 or 6-5 to pass, transmitting to the next stage through the bus 7-4. In this way, discharge machining is started halfway, rather than starting with rough machining.

FIG. 8 shows a process for fetching certain predetermined data corresponding to the $I_p$ data from the data storage ROM 5-18 or 6-5. For example, addresses in the $T_{ON}$ data storage ROM 8-1 and the $T_{OFF}$ data storage ROM 8-2 are designated to fetch the data for determining the lengths of $T_{ON}$ and $T_{OFF}$ shown in FIG. 4 stored in those addresses. That is, when changing a discharge current set value, the set values for $T_{ON}$ and $T_{OFF}$ can be changed accordingly. In the parameter storage ROM 8-3 stored are the data on polarity to select the polarity of the electrode to positive or negative sides, and the data on various parameters for the data on how to jump the electrode.

Figure 9:
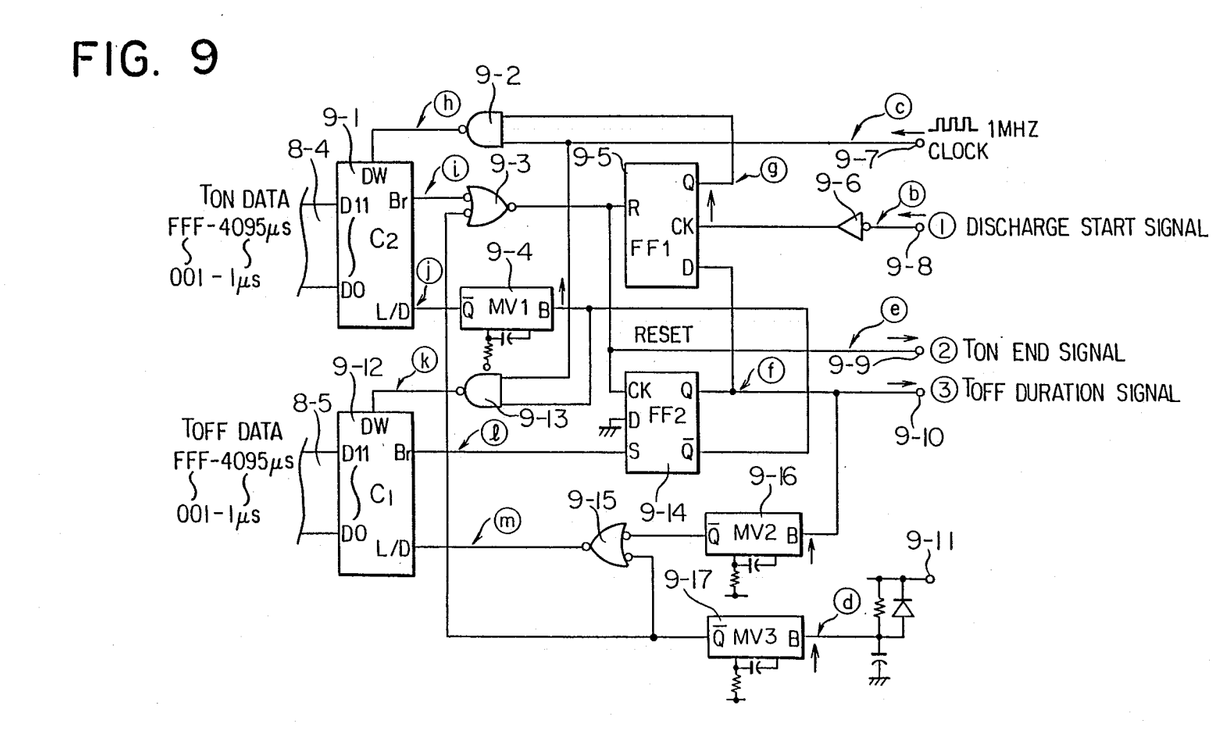
FIG. 9 is a diagram illustrating a control signal generating circuit

The $T_{ON}$ data and the $T_{OFF}$ data fetched in this way are each fed to the $T_{ON}$ width setting counter 9-1 and the $T_{OFF}$ width setting counter 9-12, shown in FIG. 9, respectively.

FIG. 9 shows a control signal generating circuit, which generates discharge pulses shown in FIG. 4. As described with reference to FIG. 4, discharge (i.e., the $T_{ON}$ duration) starts in a little while after voltage application starts (that is, after the $S_{On}$ duration starts). The signal detecting the start of discharge enters from the terminal 9-8 of FIG. 9. The data for determining the length of the $T_{ON}$ duration stored in the $T_{ON}$ width setting counter 9-1, as described above, is counted down by the clock fed from the terminal 9-7, starting from the time when a discharge start signal enters. As the countdown reaches zero, a $T_{ON}$ end signal is transmitted. In this way, the length of $T_{ON}$ can be set to a length corresponding to the value that is given in advance. The $T_{ON}$ end signal is led out of the terminal 9—9, and fed to the terminal 5-4 shown in FIG. 5 or 6. The $T_{OFF}$ width setting counter 9-12, upon receiving the $T_{ON}$ end signal, starts the countdown of the $T_{OFF}$ data stored in a similar manner, and transmits a $T_{OFF}$ signal when the countdown reaches zero. The $T_{OFF}$ width setting flip-flop circuit 9-14, wherein receives the $T_{OFF}$ end signal, transmits from the terminal 9-10 the $T_{OFF}$ duration signal for a duration from the receipt of the $T_{ON}$ end signal to the receipt of the $T_{OFF}$ end signal. Thus, the $T_{OFF}$ duration signal transmitted in this way is sent to the terminal 2—2 of the driver 2-3 of FIG. 2 to determine the off duration of discharge pulses. In FIG. 9, 9-4, 9-16 and 9-17 refer to multivibrators, and 9-5 to a $T_{ON}$ width setting flip-flop circuit.

Figure 10:
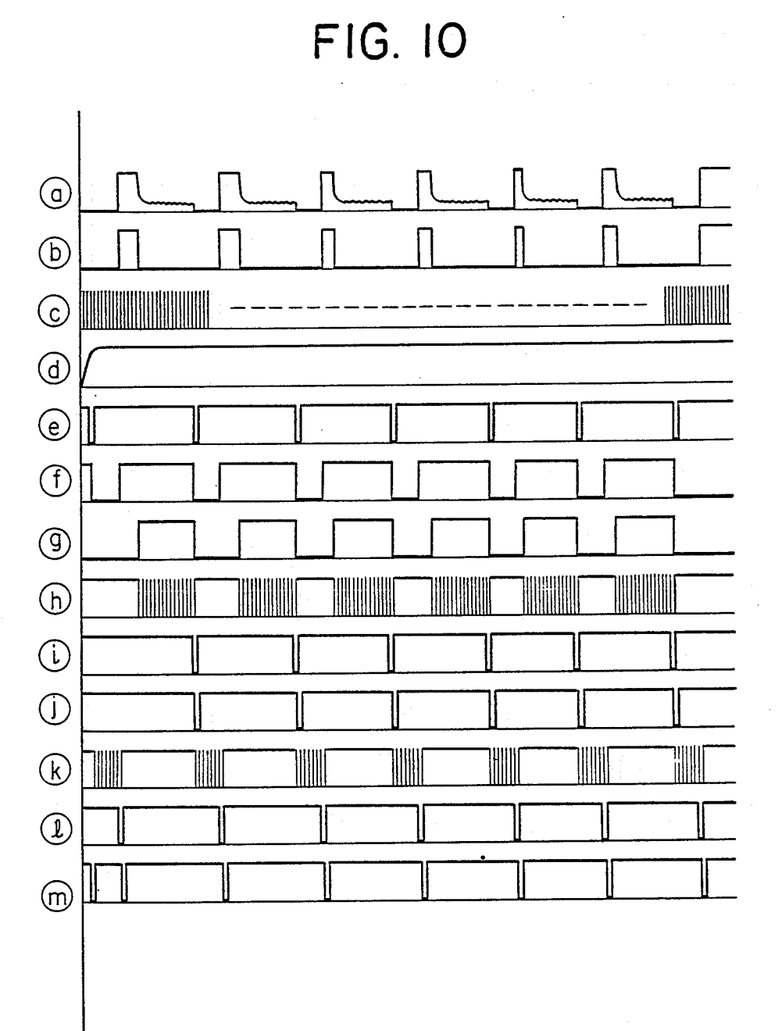
FIG. 10 is a waveform diagram for the circuit shown in FIG. 9

In FIG. 10, symbol ⓐ refers to a portion shown by symbol ⓐ in FIG. 1, and other symbols to those portions corresponding to like symbols in the circuit shown in FIG. 9. The waveforms indicated by symbols in FIG. 10 are those waveforms at portions indicated by like symbols in FIG. 9.

Figure 11:
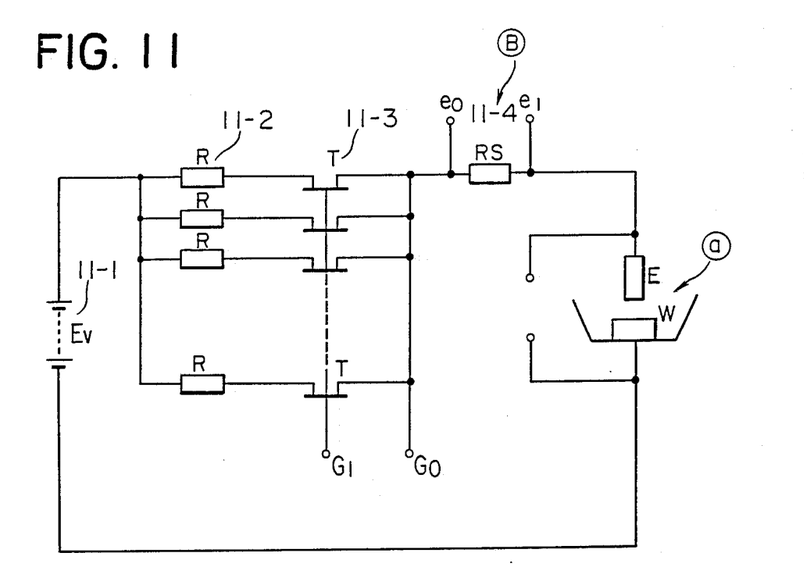
FIG. 11 is a diagram illustrating a main circuit of a second embodiment of this invention

FIG. 11 shows a second embodiment of this invention. This embodiment employs a so-called continuous control system which varies equivalent resistance values, rather than controlling current by switching transistors. In FIG. 11, numeral 11-2 refers to a derating resistor; 11-3 to an FET transistor; 11-4 to a current detecting element (e.x., resistor, Hall element); E to an electrode; and W to a workpiece, respectively. The current detecting signal taken out of the current detecting element 11-4 is compared with the reference value, and if there is a deviation, such a control signal as to eliminate the deviation is produced to control the transistor T. A control circuit for producing such a control signal is shown in FIG. 12.

Figure 12:
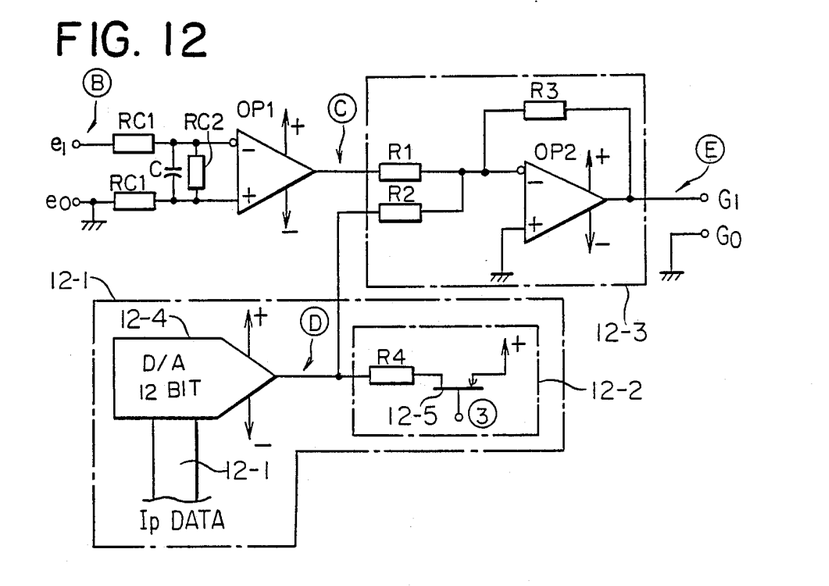
FIG. 12 is a diagram of a control circuit of a second embodiment of this invention
Figure 13:
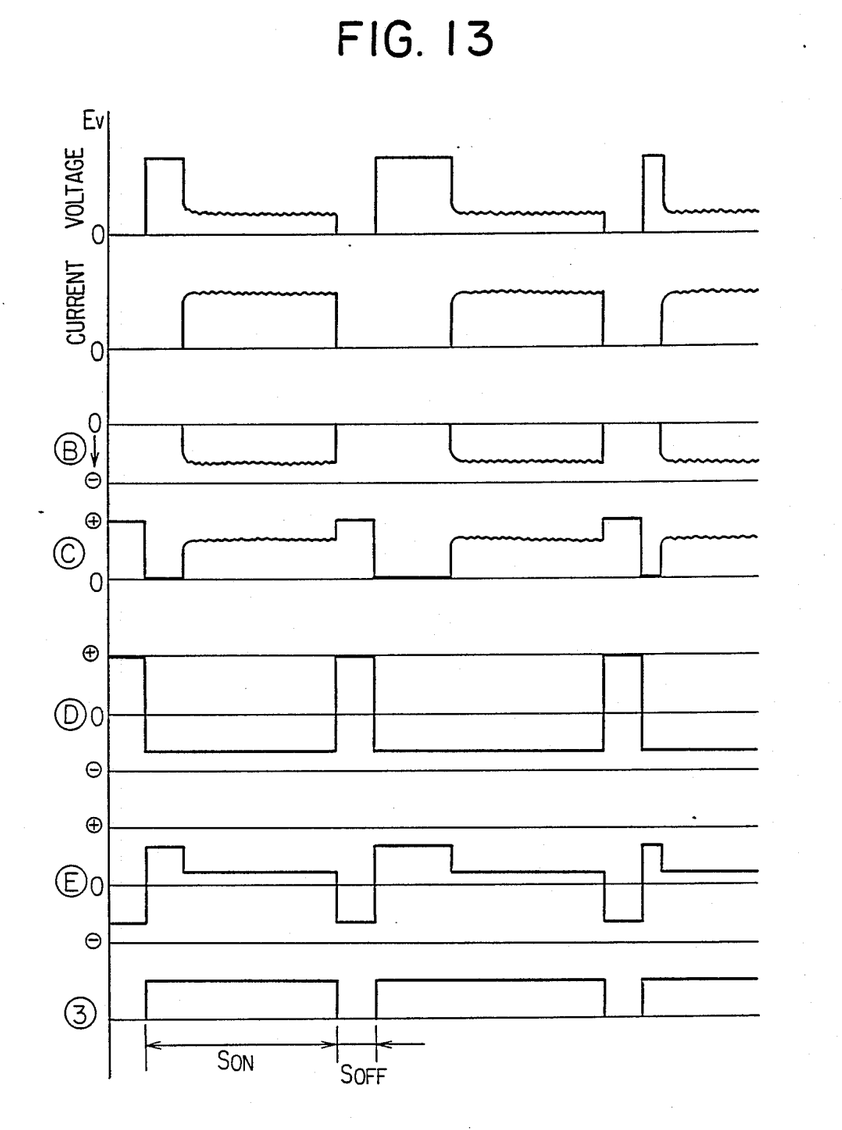
FIG. 13 is a waveform diagrams for the circuits shown in FIGS. 11 and 12

In FIG. 12, 12-1 refers to a reference value section; 12-2 to a section for locking the reference value during the $T_{ON}$ duration; and 12-3 to a comparing section, respectively. A reference value corresponding to a given $I_p$ data is generated from the reference value section 12-1, and compared with the current detecting signal entering from the terminals $e_1$ and $e_0$. A control signal for the transistor T is taken out of the terminals $G_1$ and $G_0$. The magnitude of discharge current, or machining conditions can be continuously changed by continuously changing the reference value by continuously changing the $I_p$ data. The section for locking the reference value during the $T_{ON}$ duration 12-2 is adapted to prevent the reference value from varying as long as the discharge current keeps flowing because changing the reference value during that duration is not favorable to discharge machining. Waveforms corresponding to the portions indicated alphabetically in FIG. 12 are shown in FIG. 13. In FIG. 13, the waveform indicated as "Voltage" is the waveform of the voltage across the electrode E and the workpiece W in FIG. 11, and the waveform indicated as "Current" is the waveform of the discharge current. The $T_{OFF}$ duration signal from the terminal 9-10 shown in FIG. 9 is inputted into ③, which is the section for locking the reference value during the $T_{ON}$ duration.

Figure 14:
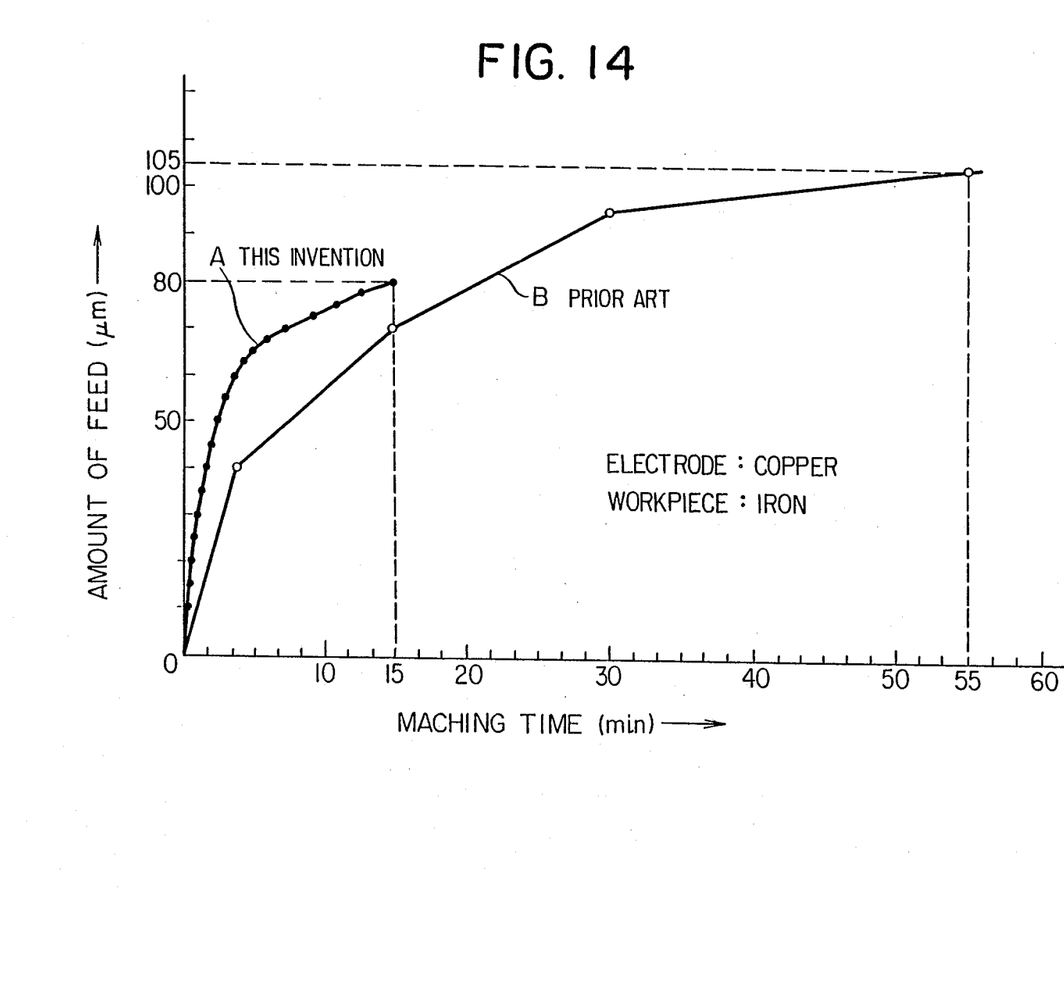
FIG. 14 is a diagram illustrating machining time and electrode feed when a workpiece of surface roughness of 30 $\mu$m, Rmax into that of 5 $\mu$m Rmax

FIG. 14 is diagram comparing discharge machining with the prior art and discharging machining of this invention, illustrating the relationship between the machining time and the electrode feed when discharge machining a workpiece of surface roughness 30 μm Rmax into that of 5 μm Rmax. The materials of the electrode and the workpiece are copper and iron, respectively. While the prior art requires an electrode feed of 105 μm and a machining time of 55 minutes, this invention requires only 80 μm of electrode feed, about 10% less than that required for the prior art, and 15 minutes of machining time, a saving of about 70%.

As described above, this invention, which continuously changes machining conditions in accordance with the progress of discharge machining, rather than changing machining conditions by temporarily interrupting current, makes it possible to continuously make chips in the discharge gap finer and to prevent chips from scattering during machining. This leads to discharge machining with consistent and uniform accuracy and workmanship, realizing discharge machining with high reproducibility. It does not take much time to control the electrode feed, and discharge machining is performed efficiently under appropriate machining conditions in accordance with the progress of machining.

What is claimed is:

1. A machining control device for discharge machining equipment for controlling discharge machining performed by said discharge machining equipment by controlling the state of discharge generated by voltage application between an electrode and a workpiece, comprising: a closest distance information storage means for storing information on the closest distance between said electrode and said workpiece from the start of machining to a current moment in accordance with information on electrode travel; and, a discharge machining condition information storage means for storing information on discharge machining conditions for machining said workpiece more accurately as the distance between said electrode and said workpiece is reduced in the form of continuous function with respect to the distance between said electrode and said workpiece, said machining control device is adapted to control the state of discharge between said electrode and said workpiece in accordance with said information on discharge machining conditions stored in said discharge machining condition information storage means, said machining control device including a working distance detecting means for detecting that distance between said electrode and said workpiece is more than a predetermined value, operation of said closest distance information storage means being prevented to said workpiece, said value counted by said counter mean is latched in said latching means.

2. A machining control device for discharge machining equipment as claimed in claim 1 wherein said machining control device has a discharge current value setting means for setting a discharge current between said electrode and said workpiece, and a discharge pulse width setting means for setting discharge pulse width; characterized in that said discharge machining condition information in said discharge machining condition information storage means is adapted to control both said discharge current value setting means and said discharge pulse width setting means.

3. A machining control device for discharge machining equipment as claimed in claim 1 wherein said closest distance information in said closest distance information storage means is updated in synchronism with a discharge pulse ON duration end signal.

4. A machining control device for discharge machining equipment as claimed in claim 2 wherein said discharge current value setting means comprises a transistor means for controlling the supply of discharge current to said electrode, and a base potential control means for controlling the base current of said transistor means.

5. A machining control device for discharge machining equipment as claimed in claim 1 wherein said discharge machining condition information storage means comprises a reloadable memory means.

6. A machining control device for discharge machining equipment as claimed in claim 1 wherein said closest distance information storage means comprises a counter means for counting the number of electrode travel pulses, a latching means for latching the value counted by said counter means, and a comparator means for comparing said value counter by said counter means with said value latched by said latching means; characterized in that when the value counted by said counter means is found smaller than said value latched by said latching means, indicating that said electrode approaches closer to said workpiece, said value counted by said counter mean is latched in said latching means.

7. A machining control device for discharge machining equipment as claimed in claim 2 wherein said discharge current value setting means comprises a plurality of current generating means for generating different discharge current values, and a gate means for on-off controlling the supply of each of the discharge currents generated by said current generating means to said electrode.

8. A machining control device for discharge machining equipment for controlling discharge machining performed by said discharge machining equipment by controlling the state of discharge generated by voltage application between an electrode and a workpiece, comprising: a closest distance information storage means for storing information on the closest distance between said electrode and said workpiece from the start of machining to a current moment in accordance with information on electrode travel; and, a discharge machining condition information storage means for storing information on discharge machining conditions for machining said workpiece more accurately as the distance between said electrode and said workpiece is reduced in the form of continuous function with respect to the distance between said electrode and said workpiece, said machining control device is adapted to control the state of discharge between said electrode and said workpiece in accordance with said information on discharge machining conditions stored in said discharge machining condition information storage means, said closest distance information storage means comprises a counter means for counting the number of electrode travel pulses, a latching means for latching the value counted by said counter means, and a comparator means for comparing said value counted by said counter means with said value latched by said latching means; characterized in that when the value counted by said counter means is found smaller than said value latched by said latching means, indicating that said electrode approaches closer so long as said working distance detecting means detects that distance between said electrode and said workpiece is more than a predetermined value.

9. A machining control device for discharge machining equipment for controlling discharge machining performed by said discharge machining equipment by controlling the state of discharge generated by voltage application between an electrode and a workpiece, comprising: a closest distance information storage means for storing information on the closest distance between said electrode and said workpiece from the start of machining to a current moment in accordance with information on electrode travel; and, a discharge machining condition information storage means for storing information on discharge machining conditions for machining said workpiece more accurately as the distance between said electrode and said workpiece is reduced in the form of continuous function with respect to the distance between said electrode and said workpiece, said machining control device is adapted to control the state of discharge between said electrode and said workpiece in accordance with said information on discharge machining conditions stored in said discharge machining condition information storage means, said closest distance information in said closest distance information storage means is updated in sychronism with a discharge pulse ON duration end signal.

* * * * *